Patented Feb. 22, 1944

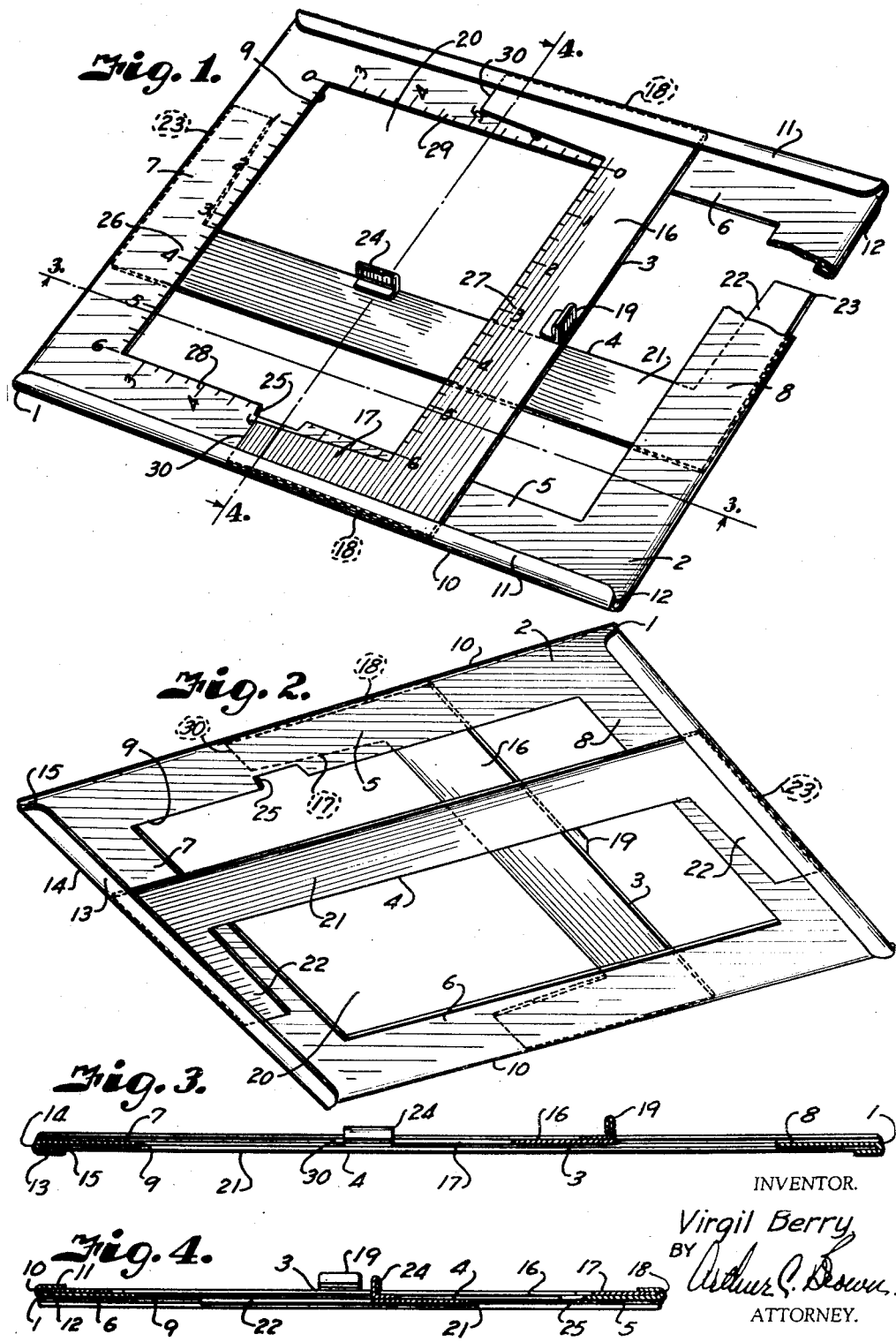
Feb. 22, 1944. V. BERRY 2,342,525
PHOTOGRAPHIC MASK
Filed Sept. 14, 1942
INVENTOR.
Virgil Berry
BY
ATTORNEY.

2,342,525

UNITED STATES PATENT OFFICE 2,342,525

PHOTOGRAPHIC MASK

Virgil Berry, Okmulgee, Okla.

Application September 14, 1942, Serial No. 458,193

6 Claims. (Cl. 88—24)

This invention relates to photographic masks such as are used in the art of photography to protect portions of sensitized paper extending beyond the dimensions of the picture desired from light rays during exposure of a print or the like and for forming a border on said paper. The invention relates more particularly to a masking frame having relatively movable blades thereon for varying the size of the picture being printed.

The principal object of the present invention is to provide a masking frame which may be quickly adjusted in such a manner that it is applicable for effective use with negatives of various sizes.

Other objects of the invention are to provide a masking frame with oppositely disposed guides in which the masking blades are arranged with one blade above and one blade below said frame; to provide masking blades on a frame having guide engaging members at each end of said blades; to provide blades on a masking frame that are movable in opposite directions without interference or contact between said blades; to provide cooperating guides and tongues on the frame and blades respectively for eliminating side sway of said blades; and to provide a masking device in which the print or paper exposing opening is square or rectangular regardless of adjusted size.

Further objects of the invention are to provide a masking device with oppositely arranged scales for indicating the dimensions of all sizes of the prints; to provide means on each blade for moving same; to provide frictional engagement between the frame guides and the blades for holding the blades in adjusted position; to provide a masking device requiring a minimum of parts and adjustments for moving said parts; to provide an arrangement of frame and blades which eliminates a tendency of a given picture to be narrower at one end than at its other end; to provide a masking device adapted for use with or without an easel; to provide a masking device adapted to be formed from materials resistant to chemical corrosion; to provide a masking device of this character which is sturdy, durable, and simply constructed, yet economical and efficient to use; and to provide improved elements and arrangements thereof in masking devices of the character and for the purposes set forth.

In accomplishing these and other objects of the invention I have provided improved details of structure, the preferred form of which is illustrated in the accompanying drawing wherein:

Fig. 1 is a top perspective view of a photographic masking device embodying my invention.

Fig. 2 is a bottom perspective view of my improved masking device particularly showing the guides for the longitudinal blades.

Fig. 3 is a longitudinal sectional view through the masking device on the line 3—3, Fig. 1.

Fig. 4 is a transverse sectional view through the masking device on the line 4—4, Fig. 1.

Referring more in detail to the drawing:

1 designates an illustrative embodiment of my invention of a masking device, which in the present instance comprises a frame 2 carrying movable blades 3 and 4. The frame 2, and blades 3 and 4 may be composed of any sheet material such as plastic, hard rubber, tin, brass, aluminum or other suitable material, preferably resistant to chemical corrosion, and impervious to dampness or water whereby the frame and blade do not buckle or warp.

The frame 1 is preferably of one piece, rectangular in form, and consists of side members 5 and 6 and end members 7 and 8 bounding a rectangular opening 9 of any standard size suitable for photographic enlargements. The outer edges of the side members 5 and 6 are turned upwardly and inwardly, as at 10, to form inwardly projecting flanges 11 extending over a portion of the side member and cooperating therewith to form guides 12 for receiving the blade 3 as later described.

The outer edges of the end members 7 and 8 are provided with similar flanges 13 which are turned downwardly and inwardly, as at 14, to underlie a portion of the end members and cooperate therewith to form guides 15 for receiving the blades 4. It is to be understood that when the frame is constructed of material not suitable for forming of the flanges integrally with side members of said frame, that the flanges and guides may be separate pieces and attached to the side members of the frame by suitable fastening devices. It is also to be noted that these flanges add to the rigidity of the frame as well as serving as guides for the blades.

The blade 3 consists of a strip 16 of suitable length to span the width of the opening 9 and is provided with lateral extensions or tongues 17 adjacent the ends of the blades to provide a long bearing between the blades and the guides 11, the edges 18 of said blade and lateral extension being received in the guides 12 and having sufficient frictional engagement therewith to resist accidental movement relative to the frame. The blade 3 is provided with an upwardly projecting flange 19 preferably located adjacent the center thereof to facilitate movement and to adjust said blade to a desired position whereby the opening 20 for the picture, as defined by the side member 7 and the blade 3, may be adjusted to a suitable size.

The blade 4 is constructed similarly to the blade 3 and preferably consists of a strip 21 provided with lateral extensions 22 having side edges 23 engaged in the guide 15, said blade and extension 22 being of sufficient length and having sufficient bearing in said guide to eliminate side sway of the blade and provide sufficient friction to prevent accidental movement of said blade. Blade 4 is also provided with an upwardly extending flange 24 to facilitate movement of the blade to selected positions relative to the frame. Since the blade 4 is mounted on the lower side of the frame 2 the side member 5 is notched as at 25, to receive the flange 24 when the blade 4 is moved to position to open the entire width of the opening 9 for exposure of a picture therethrough.

The end member 7 and the blades 3 are preferably provided with similar indicia 26 and 27 respectively adjacent the opening therebetween whereby the inner edge of the blade 4 aligns the markings of the indicia to indicate the dimensional width of the opening 20 or the width of the exposed picture being formed.

The side members 5 and 6 are also provided with indicia 28 and 29 adjacent the opening 9 and adapted to cooperate with the ends 30 of the extension 17 on the blade 3 to indicate the length of the opening 20 or the length of the picture being formed.

Having the indicia on all four sides of the openings permits the user to quickly and accurately position the strips whereby the opening between them will result in a prescribed area and it may also be readily determined that the blades are not subject to side sway and the picture takes a rectangular form. The ends of the guides 12 and 15 are preferably open whereby the individual parts may be formed and the masking device is assembled by sliding the blades 3 and 4 into the respective guides 12 and 15 which locates the blades 3 and 4 above and below the side members respectively in such a manner that there is no actual contact or interference between the blades tending to cause the blades to move out of proper angular relationship.

In using a masking device constructed and assembled as described, the blade 3 is moved in the guides 12 until the end edges 30 of the extension 17 align with the desired marking in the indicia 28 and 29 to indicate the proper length of the opening 20. The blade 4 is then adjusted in the guides 15 until the inner edge of the strip 21 aligns with the proper markings in the indicia 26 and 27 to indicate the proper width of the picture to be printed. The entire blade and frame assembly, after the blades are adjusted to desired positions, is placed over suitable sensitized paper and the picture projected through the opening 20 onto the said paper, after which the print is developed in the usual manner and the portion of the sensitized paper which was protected by the blades and frame surrounding the opening 20 remains the natural color of the paper to present a pleasing border around the print.

It is apparent, therefore, that I have provided a photographic masking device which is simply constructed yet durable, economical and efficient, which is adapted to be formed of material resistant to chemical corrosion and which is admirably suited for the purposes for which it was designed.

What I claim and desire to secure by Letters Patent is:

1. In a photographic masking device, a rectangular frame of thin material having an opening therein, upwardly and inwardly turned edges on the frame for forming guide means on opposite sides of the frame, a U-shaped blade the arms of which U-shaped blade form elongated side edges for engaging said guide means, said blade being independently movable relative to the frame for varying the size of the opening between said frame and blade, and indicia on the sides of the frame opening adjacent the guide means for cooperating with the blade to determine the dimension of the opening between said blade and frame.

2. In a photographic masking device, a rectangular frame having an opening therein, guide means on the sides of the frame above said frame, a blade having ends engaging said guide means and being independently movable over said frame and relative thereto for varying the size of the opening between said frame and blade, guide means on the sides of the frame under said frame, and a blade having ends engaging said second named guide means and being movable under said frame and relative thereto for varying the opening between the frame and the second named blade.

3. In a photographic masking device, a rectangular frame having upper and lower faces and having sides defining an opening for arrangement over a piece of sensitized paper, means forming guides on a pair of opposite side edges of the frame, said guide means being above the frame, means forming guides on the other pair of opposite side edges of the frame, said second named guide means being below the frame, a blade having ends engaged with the first named guides arranged for independent movement on the upper face of the frame, and a blade having ends engaged in the second named guides arranged for independent movement on the lower face of the frame for cooperating with the first mentioned blade and the frame for varying the size of the opening defined thereby.

4. In a photographic masking device, a rectangular frame having sides defining an opening for arrangement over a piece of sensitized paper, means forming guides on a pair of opposite side edges of the frame, said guide means being above the frame, means forming guides on the other pair of opposite side edges of the frame, said second named guide means being below the frame, a blade having ends engaged with the first named guides arranged for independent movement over the frame, a blade having ends engaged in the second named guides arranged for independent movement below the frame for cooperating with the first mentioned blade and frame for varying the size of the opening defined thereby, and indicia on the sides of the frame and at least one of the blades for determining the dimensions of said opening defined by said blades and frame.

5. In a photograph masking device, a rectangular frame of thin material having sides defining an opening for arrangement over a piece of sensitized paper, upwardly and inwardly turned flanges on a pair of opposite side edges of the frame forming guide grooves above the frame, downwardly and inwardly turned flanges on the other pair of opposite side edges forming guide grooves below the frame, a blade having laterally extending portions at the end edges thereof for forming elongated edges of the blade, said edges having engagement with the guide grooves above the frame for independent movement of said blade above said frame, and a blade having laterally extending portions at the end edges thereof for forming elongated edges of the blade, said edges of the second named blade having engagement with the guide grooves below the frame for independent movement of said second named blade below the frame for cooperating with the first named blade and frame for varying the size of the opening provided thereby.

6. In a photographic masking device, a rectangular frame having an opening therein, guide means on the sides of the frame above and below said frame, blades having ends engaging said guide means above the frame, and other blades having ends engaging the guide means below the frame, said blades being independently movable relative to the frame for varying the size of the opening between said frame and blades.

VIRGIL BERRY.